May 15, 1951      J. K. HELLER      2,552,785

VALVE

Filed Jan. 19, 1946      5 Sheets-Sheet 1

FIG. 1

INVENTOR.
JOHN K. HELLER

BY

ATTORNEY

May 15, 1951  J. K. HELLER  2,552,785
VALVE

Filed Jan. 19, 1946  5 Sheets-Sheet 2

FIG. 2

INVENTOR.
JOHN K. HELLER
BY
ATTORNEY

May 15, 1951

J. K. HELLER 2,552,785

VALVE

Filed Jan. 19, 1946

INVENTOR.
JOHN K. HELLER
BY
ATTORNEY

May 15, 1951   J. K. HELLER   2,552,785
VALVE
Filed Jan. 19, 1946   5 Sheets-Sheet 4

INVENTOR.
JOHN K. HELLER
BY
ATTORNEY

FIG. 7.

Patented May 15, 1951

2,552,785

UNITED STATES PATENT OFFICE 2,552,785

VALVE

John K. Heller, San Francisco, Calif., assignor to Gasair Corporation, San Francisco, Calif., a corporation of California Application January 19, 1946, Serial No. 642,187

25 Claims. (Cl. 137—139)

This invention relates to snap-acting valves and particularly to snap-acting valves of the pressure loaded type for opening and closing one conduit to fluid flow therethrough in response to changes in fluid pressure in another conduit.

It is a general object of the invention to provide an improved snap-acting valve of the pressure loaded type that is sensitive to relatively small changes in pressure in the pressure loading conduit and that will rapidly operate between fully open and fully closed positions.

Another object of the invention is to provide a snap-acting valve of the pressure loaded type that is capable of operating against a high pressure in the conduit to be opened and closed in response to small variations in a relatively low pressure in the pressure loading conduit.

Another object of the invention is to provide a snap-acting valve of the pressure loaded type in which the range of variation in pressure in the pressure loading conduit required to actuate the valve may be readily widened or narrowed and raised or lowered.

Another object of the invention is to provide a snap-acting valve of the pressure loaded type in which the above mentioned adjustments may be made while the valve is in service without interrupting its operation.

Another object of the invention is to provide a pressure loaded, snap-acting valve that will continue to operate for long periods of time precisely at the selected loading pressures for which it is set.

Another object of the invention is to provide a pressure loaded, snap-acting valve that is mechanically reliable and positive in its action.

Still other objects and advantages of the invention will become apparent from the following description of a preferred embodiment of the invention that has been selected for illustrative purposes and is shown in the accompanying drawings, in which:

Figure 1:
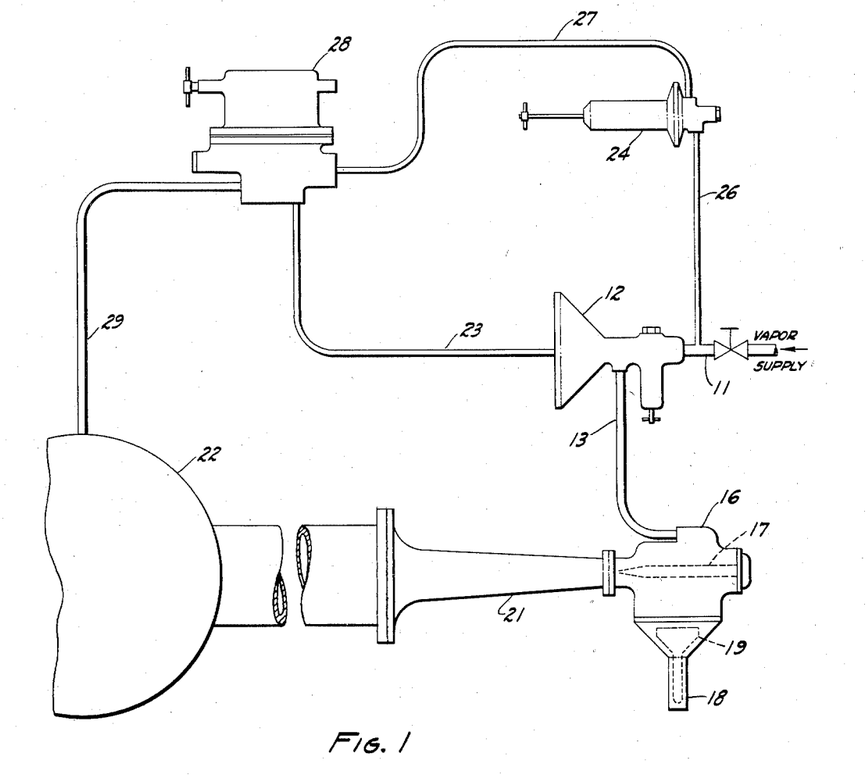
Fig. 1 is a schematic flow diagram of a gas mixing system in which a valve embodying the present invention may be advantageously employed.

Referring first to Fig. 1, a schematic flow diagram is shown for a gas mixing system adapted to receive, for example, an undiluted combustible gas or vapor under relatively high pressure for mixing therewith a selected proportion of another gas and supplying the mixture at a lower pressure to a gas reservoir or surge tank that in turn supplies the mixed gas to a distribution system. The type of system shown is one designed to maintain a pressure of mixed-gas in the reservoir that will vary only within a selected range, in spite of a non-uniform demand from the distribution system. In the following description of this sytem and of a special snap-acting valve embodying the present invention, it will be assumed, for illustrative purposes, that gaseous butane under high pressure is to be mixed with air and fed at a relatively low pressure to a reservoir that in turn feeds a mixed-gas distribution system supplying a number of remote stations with a mixture of butane and air suitable for fuel. For this purpose, the gas mixing system may comprise any suitable source (not shown) of gaseous butane under pressure for supplying the butane through a conduit 11 to a distributor 12 that acts both as an "on" and "off" valve and as an output pressure regulator of the pressure loaded type for roughly regulating the outgoing pressure. From the distributor 12, the butane flows under a roughly uniform pressure through a conduit 13, preferably having an interposed check valve (not shown) to an aspirator type of mixer 16. Within the mixer, the butane flows through a nozzle 17 and is mixed with air admitted through an air inlet 18, including a check valve 19. The mixture of butane and air passes from the mixer 16 through a Venturi tube 21 into a large reservoir or surge tank 22, during which passage the pressure of the gas mixture is dropped to within a selected range to be maintained in the reservoir 22.

The vapor outlet pressure from the distributor 12, when the distributor is in its "on" condition, may be controlled by a regulated pressure of butane gas supplied to the distributor through a conduit 23, the distributor being adapted to change to its "off" condition when the pressure in the conduit 23 is cut off. Suitable apparatus for supplying butane under pressure for this purpose to the distributor 12 through the conduit 23 may comprise a conventional form of pressure regulator 24 having its high pressure side connected to the high pressure vapor supply conduit 11 through an intermediate conduit 26, and its low pressure side connected to and maintaining a constant pressure in the pressure loading conduit 23 through an intermediate conduit 27 and through a pressure loaded, snap-acting valve unit 28.

The function of the valve unit 28 is to maintain communication between the conduits 23 and 27 for holding the distributor 16 in its "on" condition until the mixed-gas pressure in the reservoir 22 reaches a pre-selected maximum value, then to interrupt communication between the conduits 23 and 27 for permitting the distributor to change to its "off" condition, and then to restore communication between the conduits 23 and 27 for shifting the distributor back to its "on" condition when the pressure in the reservoir 22 has dropped to a pre-selected minimum. To enable the snap-acting valve unit 28 to perform this function, it is maintained in communication with the reservoir 22 by means of an intermediate conduit 29. A valve unit constructed in accordance with the present invention is admirably adapted to perform the last described series of operations, and a preferred embodiment of such a valve will now be described to illustrate the invention and its mode of operation.

Figure 2:
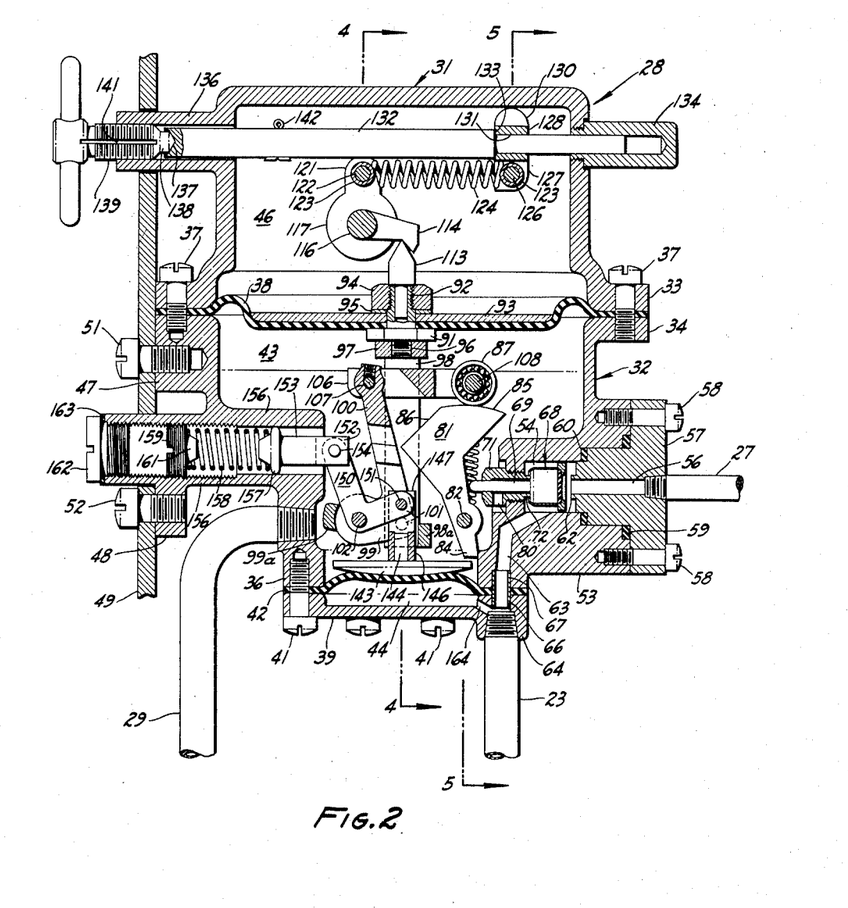
Fig. 2 is a vertical, sectional view of a valve embodying the present invention and showing the valve actuating mechanism as it appears when the valve is open.
Figures 3, 4:
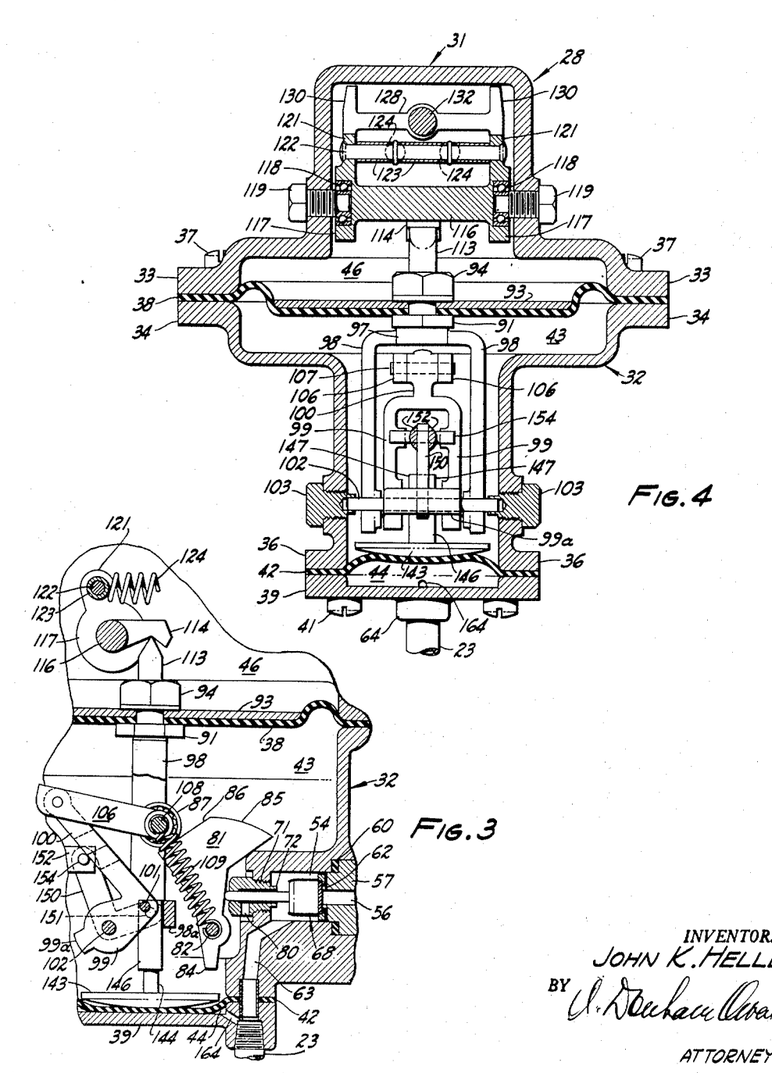
Fig. 3 is a fragmentary view similar to Fig. 2, showing a portion of the valve actuating mechanism as it appears when the valve is closed.
Fig. 4 is another vertical, sectional view of the valve shown in Figs. 2 and 3, taken as indicated by the line 4—4 in Fig. 2.

Referring first to Figs. 2 to 4, and particularly to Fig. 2, the valve unit illustrated therein comprises a housing that includes an upper hollow casting 31 and a lower hollow casting 32. The upper casting 31 is generally cup-shaped and is provided with an open lower end terminating in an outwardly projecting annular flange 33. The lower casting 32 defines a generally cylindrical upper cavity having an open upper end terminating in an outwardly projecting, annular flange 34 adapted to register with the similar flange 33 of the upper casting, and also partially defines a generally cylindrical lower cavity communicating with the upper cavity and having an open lower end terminating in an outwardly projecting annular flange 36 (Fig. 4). The annular flanges 33 and 34 of the two castings 31 and 32 are secured together by a series of bolts 37 with the marginal portion of a large, circular, flexible diaphragm 38 pierced by the bolts 37 and sandwiched between these flanges; and a closure disk 39, having a slightly dished inner surface, is secured to the annular flange 36 by a series of bolts 41 with the marginal portion of a small, circular, flexible diaphragm 42 pierced by the bolts 41 and sandwiched between the flange 36 and the marginal portion of the disk 39. Thus, the composite valve unit housing defines a large chamber divided into three superposed compartments by the two diaphragms 38 and 42. The two lower compartments 43 and 44 are employed as sealed gas chambers for purposes described hereinafter, whereas the uppermost compartment 46 is vented to the atmosphere and serves merely as as support and as a shield from dust and dirt for the apparatus contained therein. For greater clarity in the following description, therefore, the two lower compartments 43 and 44 will be respectively referred to as upper and lower pressure compartments, and the uppermost compartment 46 will be referred to as an air compartment.

For convenience in supporting the valve unit assembly in a desired location, the lower casting 32 may be provided with two integrally formed ears or lugs 47 and 48 adapted to abut a supporting panel 49 or the like. The ears 47 and 48 may be suitably drilled and tapped to receive respective cap screws 51 and 52, or the like, for holding the valve housing securely against the panel 49.

The valve per se, that is to be interposed between the conduits 27 and 23 leading from the pressure regulator 24 to the distributor 12, is contained within a hollow boss 53 integrally formed on the lower casting 32 and defining a generally cylindrical valve chamber 54. An inlet port 56 for the valve chamber 54 is formed in a block or plug 57 that projects into a complementary-shaped aperture in the boss 53. The block 57 forms one end-wall of the valve chamber 54 and is secured in place by a number of cap screws 58, or the like. The portion of the block 57 that projects into the hollow boss 53 seats against suitable sealing rings 59 and 60 to prevent gas leakage, and the inner end of this portion of the block 57 is provided with an integrally formed, annular, valve seat 62 that projects slightly into the valve chamber 54. The conduit 27 from the pressure regulator 24 may be connected to the valve inlet port 56 in any suitable manner for supplying gas under uniform pressure to the valve chamber 54. An outlet port 63 for the valve chamber 54 is formed in the lower casting 32 and extends downwardly through a wall portion of the lower casting, through the marginal portion of the small flexible diaphragm 42, and through a boss 64 integrally formed on the closure disk 39. To assist in aligning the flexible diaphragm 42 so it will not interrupt the outlet port 63, a short piece of brass tubing 66, or the like, adapted to fit snugly into a slightly enlarged portion 67 of the outlet port 63 and into the boss 64 on the closure disk, may be passed through this diaphragm during assembly of the parts. The conduit 23 leading to the distributor 12 may be connected to the valve outlet port 63 at the boss 64 in any suitable manner for receiving gas under pressure from the valve chamber 54.

A suitable, poppet type, movable valve element, generally designated 68, is mounted within the valve chamber 54 for movement into and out of engagement with the valve seat 62. The movable valve element 68 includes an integrally formed valve stem 69 that extends through the adjacent wall of the lower casting 32 and into the upper pressure compartment 43. Axial movement of the valve stem 69 is guided by a bushing 71 that is threaded into the lower casting 32 and that is provided with an integrally formed, annular, valve seat 72 projecting slightly into the valve chamber 54. The valve seat 72 is adapted to engage the movable valve element 68 when the valve is open in order to prevent leakage of gas from the valve chamber around the valve stem 69 into the upper pressure compartment 43.

Figure 6:
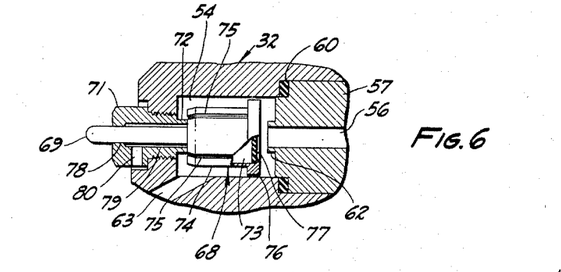
Fig. 6 is an enlarged, fragmentary, sectional view of a portion of the structure shown in Fig. 3.

As best shown in Fig. 6, the movable valve element 68 may comprise a generally cylindrical body portion 73, with which the valve stem 69 is integrally formed, the body portion being slightly tapered or chamfered adjacent the valve stem end thereof so that it may be snapped into a cylindrical cap member 74 and retained snugly therein. The wall of the cap member 74 is similarly tapered at its open end and is provided with a number of circumferentially spaced slots 75 that permit resilient, radial expansion of the cap wall while it is being snapped over the body portion 73. The cap member 74 is formed with an inwardly and outwardly projecting flange 76 at the opposite end thereof for retaining a cushioning disk 77 of synthetic rubber, fibre board, or other material suitable to effect slightly cushioned contact between the movable valve element 68 and the valve seat 62 on the block 57. The outer diameter of the flange 76 is made just enough smaller than the internal diameter of the valve chamber 54 so that the small flow of gas through the valve chamber from the conduit 27 to the conduit 23 when the valve is open may pass around the flange through the clearance space between it and the wall of the valve chamber. This clearance may be great enough to permit the necessary gas flow and still be small enough so that the pressure in the conduit 27 will force the movable valve element from the position shown in Fig. 3 to the position shown in Fig. 2 under conditions described hereinafter.

The bushing 71, in which the valve stem 69 is slidably mounted, is preferably provided with an internal bore for a portion of its length (as shown at 78) that makes a close sliding fit with the valve stem 69 for maintaining its alignment, the remainder of the length of the bore being of larger diameter (as shown at 79). A port 80 is drilled into the bushing 71 and into communication with the portion of the bore of larger diameter to permit gas passing from the valve chamber 54 into the enlarged portion of the bore around the valve stem 69 to bleed freely into the upper pressure compartment 43 when the movable valve element 68 is out of contact with the valve seat 72 on the bushing 71.

Figure 5:
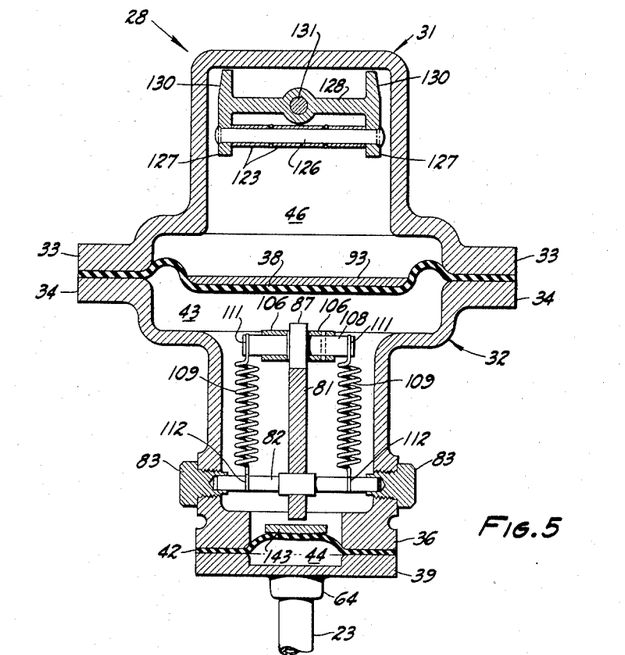
Fig. 5 is a vertical, sectional view of the valve shown in Figs. 2 and 3, taken as indicated by the line 5—5 in Fig. 2.

Inside the upper pressure compartment 43, a valve actuating lever 81 is mounted on a shaft 82 that is rotatably supported at its opposite ends in a pair of female trunnions 83 (Fig. 5), the trunnions being threaded through suitable apertures in the wall of the lower casting 32. The lever 81 may be press-fitted on the fulcrum shaft 82, is aligned with the valve stem 69, and is appropriately contoured along one side for bearing against the adjacent end of the valve stem. When pivoted in one direction, the lever 81 forces the movable valve element 68 into engagement with the valve seat 62. When pivoted in the opposite direction, the lever 81 permits the movable valve element to be forced into engagement with the valve seat 72 on the bushing 71 by the pressure supplied through the conduit 27. A projecting lower end 84 of the lever 81 functions as a stop by contacting the lower casting 32 when the movable valve element 68 is seated against the valve seat 72 and the lever has moved slightly out of contact with the valve stem 69. The other end of the lever 81 and one side thereof opposite the side contacted by the valve stem 69 are appropriately contoured to provide two angularly disposed, intersecting, cam surfaces 85 and 86 along which a lever actuating roller 87 may roll in a manner described hereinafter.

Movement of the roller 87 along the cam surfaces 85 and 86 is controlled by movement of the large flexible diaphragm 38, an interconnecting linkage housed within the upper gas chamber 43 being provided to effect such control. The linkage connection to the large diaphragm 38 includes a diaphragm stud having a hexagonal head 91 that bears against the lower surface of the diaphragm and a hollow upper shank 92 that projects from the head 91 through the center of the diaphragm and through the center of a diaphragm plate 93 that is secured against the upper surface of the diaphragm for stiffening purposes. Above the diaphragm plate 93, the upper shank 92 is threaded into a nut 94, a standard lock washer 95 being employed on the shank 92 between the diaphragm plate 93 and the nut 94. The diaphragm stud is also provided with a lower shank 96 that is threaded into a diaphragm yoke 97 having a pair of spaced-apart, downwardly-extending arms 98. At their lower ends, the arms 98 of the yoke 97 are joined by a cross-brace 98a and are respectively pivotally connected to a pair of parallel arms 99 of a lever 100 by means of a pair of pins 101. The lever 100 is generally the shape of a reversed L as viewed in Fig. 2 and as viewed in Fig. 4, resembles an inverted Y with the two arms of the Y joined by a cross-brace 99a. The fulcrum for the lever 100 is a shaft 102 that may pass freely through both arms 99 of the lever and is rotatably supported at its opposite ends (in the same manner as the shaft 82) in a pair of female trunnions 103 (Fig. 4) threaded into suitable apertures in the lower casting 32. At its upper end the lever 100 is pivotally connected to the two legs of an H-shaped link 106 by means of a pin 107, the upper end of the lever 100 being disposed between the two legs of the link 106. At the opposite end of the link 106, the roller 87 is rotatably mounted on a pin or shaft 108 that extends between and projects through the legs of the link. To insure a minimum of frictional resistance to rotation of the roller 87 on the pin 108, the roller may comprise a dust-sealed ball bearing having an inner race surrounding the pin 108 with a tight fit and an outer race constituting the rim of the roller. The pin 108 projects laterally a short distance beyond each side of the link 106 (Fig. 5) to provide anchorages for the upper ends of a pair of helical springs 109 that are held under tension. Each projecting portion of the pin 108 is provided with a circumferential groove 111 adapted to receive a loop on the upper end of the associated spring, similar loops on the lower ends of both springs being held in similar circumferential grooves 112 provided in the shaft 82 on which the valve-actuating lever is mounted.

With the above described linkage acting between the large diaphragm 38 and the roller 87, and with the roller in the position shown in Fig. 2, upward movement of the diaphragm 38 in response to an increase in the pressure within the upper pressure compartment 43 will cause the lever 100 to swing counterclockwise (as viewed in Figs. 2 and 3) about its fulcrum shaft 102 and will cause the roller 87 to roll along the cam surface 85 of the valve-actuating lever 81 toward the cam surface 86 thereof. Continued upward movement of the large diaphragm 38 will eventually permit the roller, moving under the influence of the two springs 109, to be suddenly rolled downwardly along the cam surface 86, thereby forcing the lever 81 to swing rapidly clockwise (as viewed in Figs. 2 and 3) about its fulcrum shaft 82 and to force the movable valve element 68 into valve closing engagement with the valve seat 62 on the block 57. In this position (shown in Fig. 3), the movable valve element interrupts communication between the conduits 27 and 23.

Downward movement of the large diaphragm 38, in response to a drop in the pressure within the upper pressure compartment 43, reverses the direction of travel of the roller 87 and causes it to roll up the cam surface 86 and back onto the cam surface 85, thereby permitting the valve-actuating lever 81 to swing counterclockwise (as viewed in Figs. 2 and 3) and the movable valve element 68 to move to the left into engagement with the seat 72 on the bushing 71. Because of the tension in the springs 109, the roller 87 bears forcibly on the cam surface 86 regardless of where the roller may be positioned along this surface at any given instant. Consequently, the lever 81 is held in the position shown in Fig. 3 all during the upward travel of the roller along this surface toward the intersecting surface 85, and will not be permitted to swing out of that position until the roller has actually rolled onto the surface 85.

The pressure in the upper pressure compartment 43 that is required to move the roller 87 from the inoperative position shown in Fig. 2 to the operative position shown in Fig. 3 is supplied through the conduit 29 that connects the upper pressure compartment to the reservoir 22. The magnitude of the pressure required for this purpose is determined by an adjustable spring-loaded device housed within the air compartment 46. As best shown in Figs. 2 and 4, this device includes a pivot pin 113 having a shank portion of reduced diameter that fits loosely into the upper end of the hollow upper shank 92 of the diaphragm stud. The upper end of the pivot pin 113 is tapered to a knife edge adapted to bear against the lower surface of a lever arm 114 that projects radially from the center of a horizontally disposed spindle 116. The spindle 116 is provided at its opposite ends with a pair of enlarged, integrally formed hubs 117 that are drilled or bored to receive, respectively, the outer races of a pair of ball bearings 118. The inner races of the ball bearings 118 are respectively mounted on a pair of male trunnions 119 that are threaded into opposite sides of the upper casting 31. Each of the hubs 117 on the spindle 116 is provided with a generally upwardly-extending, integrally-formed crank arm 121, and a shaft 122 extends between and is suitably mounted at its opposite ends in the crank arms 121. Between the crank arms 121, the shaft 122 is surrounded by a number of sleeves 123 that are slightly spaced-apart along the shaft to provide, in effect, a plurality of circumferential grooves therebetween that are adapted to receive and position loops in the ends of a corresponding plurality of helical springs 124, by means of which a selected torque may be applied to the spindle 116 for urging the lever arm 114 downwardly against the knife edge of the pivot pin 113.

The helical springs 124 are held under a selected tension that is manually adjustable while the valve is in service without interrupting its operation. For this purpose, a horizontally disposed shaft 126 is suitably mounted at its opposite ends in a pair of ears 127 that depend from a crosshead 128, and the shaft 126 carries the same number of encompassing sleeves 129 as there are sleeves 123 on the shaft 122. Loops on the opposite ends of the springs 124 are similarly positioned between the sleeves 129 and are secured around the shaft 126. The crosshead 128 is also provided at its opposite ends with a pair of ears 130 that extend upwardly into close proximity with the top of the upper casting 31 for preventing tilting of the crosshead in case the springs 124 are not properly balanced. At its center the crosshead is provided with an aperture 131 through which a longitudinally movable, horizontal shaft 132 is projected. The distance the shaft 132 may project through the aperture 131 in the crosshead is limited by a stop 133 on the shaft 132, which stop may conveniently comprise a circumferential shoulder formed by a change in the diameter of the shaft at that point along its length. The portion of the shaft 132 that projects through and beyond the crosshead 128 is mounted in a cap or bearing 134 that is threaded into the upper casting 31, the cap being long enough for the shaft 132 to slide a substantial distance into the cap. The opposite end of the shaft 132 projects with clearance into a long, hollow boss 136, formed integrally with the upper casting 31, and terminates within the boss. This end of the shaft is drilled or bored to provide a socket 137 adapted to receive a tip 138 of slightly smaller diameter on the end of the threaded shank of a wing screw 139, the boss 136 being internally threaded to accommodate the wing screw. For convenience, the boss 136 may be projected through a suitable aperture in the supporting panel 49 to facilitate mounting the valve unit on the panel. A longitudinally extending groove 141 is cut into the threaded shank of the wing screw to provide an air passage into the air compartment 46 for maintaining atmospheric pressure therein at all times, and a cotter pin 142, or the like, is passed through the shaft 132 at an appropriate point along the length of the shaft to provide a stop for limiting the distance the shaft can be moved into the boss 136.

By rotating the wing screw 139 in one direction, the shaft 132 is caused to move longitudinally to the right (as viewed in Fig. 2), thereby increasing the tension in the helical springs 124 and the downward force exerted upon the large diaphragm 38. Similarly, by reversing the rotation of the wing screw 139, the shaft 132 is permitted to slide in the opposite direction under the influence of the springs 124, and the downward force exerted upon the large diaphragm 38 is decreased. In this manner, the magnitude of the gas pressure in the upper pressure compartment 43 required to move the large diaphragm 38 upwardly for causing the movable valve element 68 to interrupt communication between the conduits 27 and 23, in the manner described above, may be manually adjusted while the valve is in service without interrupting its operation.

Figure 7:
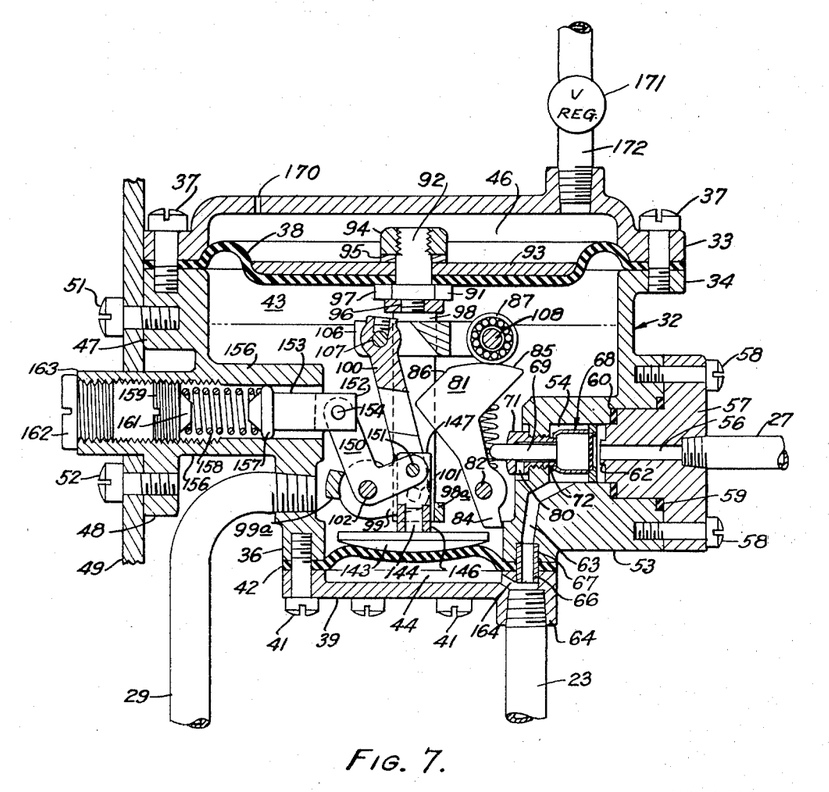
Fig. 7 is a view similar to Fig. 2 of a modified form of the invention.

While the particular embodiment of the invention disclosed herein employs a spring-loaded mechanism for loading the large diaphragm 38, it is obvious that the same end result could be accomplished in other ways. Fig. 7 illustrates one such alternative. The compartment 46 is closed to the atmosphere except for the small bleed hole 170. Air or gas under pressure is introduced to the compartment 46 through the pressure regulator 171 adjacent the inlet tube 172. By this means, a regulated gas pressure is maintained in the compartment 46 for controlling the range of operating pressure in the upper pressure compartment 43. Where this range of operating pressures is relatively high (7 or 8 lbs./sq. in. and above) such an expedient may be superior to the one illustrated in Figs. 2 to 6 and described above because the balancing of pressures on opposite sides of the large diaphragm results in lower diaphragm stresses. However, with a lower range of operating pressures, or whenever for any other reason the diaphragm stresses encountered are not of any great concern, a valve unit employing a spring-loaded mechanism for loading the large diaphragm 38 is preferred because the gas system required is less complicated and less expensive to install and maintain.

After the roller 87 has moved from its inoperative position (shown in Fig. 2) to its operative position (shown in Fig. 3) in which it holds the movable valve element 68 against the valve seat 62, a considerable drop in the pressure within the upper pressure compartment 43 would normally be required to force the roller back up the cam surface 86 to its inoperative position on the cam surface 85 for restoring communication between the conduits 27 and 23. In order to accomplish this result after only a relatively small drop in the pressure within the upper pressure compartment 43, an additional, spring-loaded, diaphragm controlled device is mounted within the lower casting 32. This device comprises a circular diaphragm plate 143 having a spherical lower surface that rests upon the small, flexible diaphragm 42. A short rod 144 is soldered or otherwise rigidly secured at one end to the upper surface of the diaphragm plate 143 and projects upwardly therefrom. Another short rod 146, larger in diameter than the rod 144, is drilled longitudinally from one end for a distance sufficient to accommodate the pin 144 therein and is longitudinally slotted at its opposite end to form a pair of upwardly projecting, spaced-apart ears 147 between which one end of a bell crank 150 is pivotally connected by means of a pin 151. The bell crank 150 may be mounted with a pressed fit on the center of the fulcrum shaft 102, midway between the arms 99 of the lever 100. The opposite end of the bell crank 150 is disposed between a pair of spaced-apart ears 152 that project from one end of a generally horizontally disposed link 153, and a pin 154 pivotally connects this end of the bell crank to the ears 152. The pin 154 projects through both of the ears 152 and beyond them in each direction (as shown in Fig. 4) so that the ends of the pin will respectively bear against a pair of inwardly projecting lugs provided for that purpose on the two arms 99 of the lever 100 when the bell crank 150 is in the position shown in Fig. 3, thereby urging the lever 100 in a clockwise direction (as viewed in Figs. 2 and 3) about its fulcrum shaft 102 for assisting return of the roller 87 to its inoperative position shown in Fig. 2.

The link 153 projects into a hollow boss 156, formed integrally with the lower casting 32, and terminates inside the boss 156 in a flanged seat 157 adapted to receive one end of a helical compression spring 158 that is housed within the boss 156. A portion of the length of the boss 156 is internally threaded, and an externally threaded plug or screw 159, having a seat 161 for the opposite end of the spring 158, is screwed into the boss for subjecting the spring to a selected, adjustable degree of compression between the screw 159 and the link 153. To insure against leakage of gas from the upper pressure compartment 43, a second plug 162, having a suitable washer or gasket 163 associated therewith, is screwed snugly into the outer end of the boss 156. The plug 162 may readily be removed while the valve is in operation in order to give access to the screw 159 for adjusting the stress in the spring 158.

At appropriate times, as described hereinafter, the force exerted on the small diaphragm 42 by the diaphragm plate 143, as determined by the compression of the spring 158, is opposed by gas pressure within the lower pressure compartment 44. Gas under pressure is admitted into the lower pressure compartment 44 for this purpose, and is subsequently exhausted therefrom, through a small passageway 164 drilled through the closure disk 39 and communicating at its opposite ends with the valve outlet port 63 and with the lower pressure compartment 44, respectively. When the movable valve element 68 is seated against the seat 62 on the block 57, as shown in Fig. 3, the valve chamber 54, the outlet port 63, and the lower pressure compartment 44 are serially in communication with the upper pressure compartment 43 through the port 80 in the bushing 71. Under these conditions, the pressure in the lower pressure compartment 44 is substantially the same as that in the upper pressure compartment 43, and the small diaphragm 42 exerts no force on the bell crank mechanism in opposition to the force exerted thereon by the compression spring 158. Consequently, the force exerted by the spring 158 is transmitted through the ends of the pin 154 to the arms 99 of the lever 100, thereby urging the lever 100 in a clockwise direction (as viewed in Figs. 2 and 3) about the fulcrum shaft 102 in opposition to the moment applied thereto as a result of the tension in the two springs 109.

When the pressure in the upper pressure compartment 43 drops sufficiently for the large diaphragm 38 to move downwardly and, with the assistance of the moment resulting from the stress in the spring 158, to actuate the lever 100 for returning the roller 87 to its inoperative position (shown in Fig. 2), the movable valve element 68 moves into engagement with the seat 72 on the bushing 71, and communications between the conduits 27 and 23 is restored. When this occurs, communication between the upper pressure compartment 43 and the valve chamber 54 is cut off, and the pressure within the conduit 27 is transmitted through the outlet port 63 and the passageway 164 into the lower pressure compartment 44. The small diaphragm 42 is forced upwardly by this pressure, thereby turning the bell crank 150 counterclockwise (as viewed in Figs. 2 and 3), in opposition to the force exerted by the spring 158, for disengaging the bell crank mechanism from the lever 100 and rendering the spring 158 inoperative. Under these conditions, a relatively small increase in the pressure within the upper pressure compartment 43 (determined by the adjustable tension in the springs 124) moves the large diaphragm 38 upwardly and again interrupts communication between the conduits 27 and 23 in the manner described above, restoring the valve-actuating mechanism to the condition shown in Fig. 3.

By adjustment of the position of the screw 159 along the length of the threaded portion of the boss 156, the force exerted by the compression spring 158 can be varied for selecting the pressure drop within the upper pressure compartment 43 to which the valve-actuating mechanism will respond for moving the roller 87 back to its inoperative position shown in Fig. 2. The greater the force exerted by the spring 158, the higher will be the minimum pressure within the upper pressure compartment; and vice versa. Also, as described above, by adjustment of the wing screw 139, the pressure in the upper pressure compartment required to move the roller 87 from its inoperative position shown in Fig. 2 to its operative position shown in Fig. 3 may be selectively varied. Thus, while the valve is in service, and without interrupting its operation, the maximum and minimum pressures in the upper pressure compartment 43 to which the valve-actuating mechanism responds may be individually or jointly raised or lowered for maintaining a selected average pressure in the reservoir 22 with a selected degree of variation from the average.

The selected maximum pressure to be reached within the upper pressure compartment is determined entirely (neglecting friction in the valve-actuating mechanism) by the force exerted by the springs 124. To permit a wide range of maximum pressures to be selected, the shafts 122 and 126 may be coupled by any desired number of springs 124 (within obvious physical limits) when the valve is assembled for any particular type of service, only changes in the length and number of spacer sleeves 123 and 129 being required. Since the compression spring 158 merely opposes the two springs 109 for reducing the difference between the maximum and minimum valve operating pressures, a change in the number of springs 124 employed for loading the large diaphragm 38 does not require a corresponding change in the strength of the compression spring 158.

Referring now to the operation of the valve unit shown in Figs. 2 to 6 with particular reference to the manner in which it functions when employed in the gas system schematically shown in Fig. 1, it will first be assumed that the movable valve element 68 is seated against the seat 72 on the bushing 71 so that the conduits 27 and 23 are in communication with each other through the valve chamber 54. Under such circumstances, the above described valve-actuating mechanism is in the condition shown in Fig. 2, and the pressure in the conduit 23 holds the distributor 12 in its "on" condition for supplying a continuous, uniform flow of butane gas to the mixer 16, within which air is mixed with the butane and from which the resulting gas mixture is supplied to the reservoir 22 through the Venturi tube 21. As the pressure in the reservoir 22 rises, a corresponding rise in the pressure within the upper pressure compartment 43 of the valve unit occurs because of its communication with the reservoir 22 through the conduit 29. As the pressure within the upper pressure compartment 43 approaches a pre-selected maximum value, determined by the tension applied to the springs 124, the large diaphragm 38 moves upwardly in opposition to the force exerted by the springs 124; and, when the pre-selected maximum pressure is reached, the roller 87 is at the intersection of the cam surfaces 85 and 86 on the valve-actuating lever 81. Any further increase in this pressure will move the roller 87 far enough for the springs 109 to pull it downwardly along the cam surface 86, thereby actuating the valve with a snap action by quickly moving the movable valve element 68 into engagement with the seat 62 on the block 57 and interrupting communication between the conduits 27 and 23. The pressure in the conduit 23 and in the lower pressure compartment 44 then immediately drops to the pressure within the upper pressure compartment 43, thereby permitting the small diaphragm 42 to move downwardly, at which time the valve-actuating mechanism is in the condition shown in Fig. 3. The drop in pressure within the conduit 23 releases the distributor 12 to its "off" condition, thereby stopping the supply of mixed-gas to the reservoir 22. As mixed gas is drawn from the reservoir 22 by whatever gas consuming equipment it supplies, the pressure within the upper pressure compartment 43 undergoes a corresponding drop. As this occurs, the combined forces exerted by the spring or springs 124 and by the spring 158 cause the large diaphragm 38 to move downwardly and the roller 87 to move along the cam surface 86 toward the cam surface 85. The pressure drop within the upper pressure compartment 43 required to move the roller 87 upwardly again to the intersection of the cam surfaces 85 and 86 depends upon the pre-selected compression applied to the spring 158 by the screw 159. When the predetermined pressure drop is exceeded, the roller 87 rolls onto the cam surface 85, and the pressure in the conduit 27 forces the movable valve element 68 quickly into engagement with the seat 72 on the bushing 71, thereby restoring communication between the conduits 27 and 23, actuating the distributor 12 back to its "on" condition for supplying butane to the mixer 16, raising the pressure within the lower pressure compartment 44, and restoring the valve-actuating mechanism to the condition shown in Fig. 2.

From the foregoing detailed description of a preferred embodiment of a valve constructed in accordance with the present invention, together with the description of a typical gas system incorporating the valve, it will be appreciated that I have provided an improved snap-acting valve fulfilling all of the objects hereinbefore mentioned. While the invention has been described by reference to many specific structural details of the embodiment selected for illustrative purposes, it will be apparent to those skilled in the art that numerous changes may be made in the described structure without departing from the true scope of the invention. Therefore, it is intended that the appended claims shall cover all such modifications of the described structure as fall within a reasonable construction of the terms employed in the claims.

I claim:

1. A snap-acting valve for opening and closing a first conduit in response to changes in fluid pressure in a second conduit, comprising a housing defining a chamber closed at one end by a first flexible diaphragm and divided into first and second compartments by a second flexible diaphragm, a port communicating with said first compartment and adapted to be connected to said second conduit, a movable valve element adapted to be interposed in said first conduit for opening and closing the same, said movable valve element having a valve stem projecting into said first compartment, first means movable between operative and inoperative positions in response to movement of said first diaphragm and being adapted in its operative position to apply a valve closing force to said valve stem, a first spring associated with said first means for urging it toward its operative position, a second spring associated with said first means for urging it toward its inoperative position, and second means operative in response to movement of said second diaphragm for rendering said second spring inoperative.

2. A snap-acting valve for opening and closing a first conduit in response to changes in fluid pressure in a second conduit, comprising a housing defining a chamber closed at one end by a first flexible diaphragm and divided into first and second compartments by a second flexible diaphragm, a port communicating with said first compartment and adapted to be connected to said second conduit, a movable valve element adapted to be interposed in said first conduit for opening and closing the same, said movable valve element having a valve stem projecting into said first compartment, first means movable between operative and inoperative positions in response to movement of said first diaphragm and being adapted in its operative position to apply a valve closing force to said valve stem, a first spring associated with said first means for urging it toward its operative position, a second spring associated with said first means for urging it toward its inoperative position, and second means acting between said second diaphragm and said second spring for rendering said second spring inoperative in response to a pressure increase in said second compartment.

3. A snap-acting valve for opening and closing a first conduit to fluid flow from a high-pressure end to a low-pressure end thereof, comprising a housing defining a chamber closed at one end by a first flexible diaphragm and divided into first and second compartments by a second flexible diaphragm, a port communicating with said first compartment and adapted to be connected to said second conduit, a port communicating with said second compartment and adapted to be connected to said first conduit adjacent the low-pressure end thereof, a movable valve element adapted to be interposed in said first conduit between the high and low-pressure ends thereof for opening and closing the first conduit, said movable valve element having a valve stem projecting into said first compartment, first means movable between operative and inoperative positions in response to movement of said first diaphragm and being adapted in its operative position to apply a valve-closing force to said valve stem, a first spring associated with said first means for urging it toward its operative position, a second spring associated with said first means for urging it toward its inoperative position, and second means acting between said second diaphragm and said second spring for rendering said second spring inoperative in response to a pressure increase in said second compartment.

4. A snap-acting valve for opening and closing a high-pressure conduit in response to changes in pressure in a low-pressure conduit, comprising a housing defining a chamber, a first flexible diaphragm closing one end of said chamber, a second flexible diaphragm dividing said chamber into first and second compartments, a port communicating with said first compartment and adapted to be connected to said low-pressure conduit, a movable valve element mounted on said housing and adapted to be interposed in said high-pressure conduit, said valve element having a valve stem projecting into said first compartment, first means movable between operative and inoperative positions in response to movement of said first diaphragm and being adapted in its operative position to apply a valve-closing force to said valve stem, a first spring associated with said first means for urging it toward its operative position, a second spring associated with said first means for urging it toward its inoperative position, second means acting between said second diaphragm and said second spring for rendering said second spring inoperative in response to a pressure increase in said second compartment, and means for subjecting said second compartment to the pressure in said high-pressure conduit when the latter is open for fluid flow therethrough.

5. A snap-acting valve for opening and closing a first conduit in response to changes in fluid pressure in a second conduit, comprising a housing defining a chamber closed at one end by a first flexible diaphragm and divided into first and second compartments by a second flexible diaphragm, a port communicating with said first compartment and adapted to be connected to said second conduit for subjecting said diaphragms to a variable pressure within said first compartment, mechanism mounted on said housing for adjusting the resistance of said first diaphragm to said variable pressure, a movable valve element adapted to be interposed in said first conduit for opening and closing the same, said movable valve element having a valve stem projecting into said first compartment, first means movable between operative and inoperative positions in response to movement of said first diaphragm and being adapted in its operative position to apply a valve-closing force to said valve stem, a first spring associated with said first means for urging it toward its operative position, a second spring associated with said first means for urging it toward its inoperative position, second means acting between said second diaphragm and said second spring for rendering said second spring inoperative in response to a pressure increase in said second compartment, and means for subjecting said second compartment to a pressure increase when said first conduit is open for fluid flow therethrough.

6. A snap-acting valve for opening and closing a first conduit in response to changes in fluid pressure in a second conduit, comprising a housing defining a chamber closed at one end by a first flexible diaphragm and divided into first and second compartments by a secnod flexible diaphragm, a port communicating with said first compartment and adapted to be connected to said second conduit for subjecting said diaphragms to a variable pressure within said first compartment, a movable valve element adapted to be interposed in said first conduit for opening and closing the same, said movable valve element having a valve stem projecting into said first compartment, first means movable between operative and inoperative positions in response to movement of said first diaphragm and being adapted in its operative position to apply a valve-closing force to said valve stem, a first spring associated with said first means for urging it toward its operative position, a second spring associated with said first means for urging it toward its inoperative position, mechanism mounted on said housing for adjusting the force exerted by said second spring on said first means, second means acting between said second diaphragm and said second spring for rendering said second spring inoperative in response to a pressure increase in said second compartment, and means for subjecting said second compartment to a pressure increase when said first conduit is open to fluid flow therethrough.

7. A snap-acting valve for opening and closing a first conduit in response to changes in fluid pressure in a second conduit, comprising a housing defining a chamber closed at one end by a first flexible diaphragm and divided into first and second compartments by a second flexible diaphragm, a port communicating with said first compartment and adapted to be connected to said second conduit for subjecting said diaphragms to a variable pressure within said first compartment, mechanism mounted on said housing for adjusting the resistance of said first diaphragm to said variable pressure, a movable valve element adapted to be interposed in said first conduit for opening and closing the same, said movable valve element having a valve stem projecting into said first compartment, first means movable between operative and inoperative positions in response to movement of said first diaphragm and being adapted in its operative position to apply a valve-closing force to said valve stem, a first spring associated with said first means for urging it toward its operative position, a second spring associated with said first means for urging it toward its inoperative position, mechanism mounted on said housing for adjusting the force exerted by said second spring on said first means, and second means acting between said second diaphragm and said second spring for rendering said second spring inoperative in response to a pressure increase in said second compartment, and means for subjecting said second compartment to a pressure increase when said first conduit is open for fluid flow therethrough.

8. A snap-acting valve for opening and closing a first conduit in response to changes in fluid pressure in a second conduit, comprising a housing defining a chamber closed at one end by a first flexible diaphragm and divided into first and second compartments by a second flexible diaphragm, a port communicating with said first compartment and adapted to be connected to said second conduit for subjecting said diaphragms to a variable pressure within said first compartment, said housing also defining a valve chamber adapted to be interposed in said first conduit and including an inlet and an outlet port permitting fluid flow therethrough, a movable valve element disposed in said valve chamber for opening and closing the valve chamber to fluid flow therethrough, said movable valve element having a valve stem projecting into said first compartment, first means movable between operative and inoperative positions in response to movement of said first diaphragm and being adapted in its operative position to apply a valve-closing force to said valve stem, a first spring associated with said first means for urging it toward its operative position, a second spring associated with said first means for urging it toward its inoperative position, second means acting between said second diaphragm and said second spring for rendering said second spring inoperative in response to a pressure increase in said second compartment, and a conduit connecting said outlet port with said second compartment for controlling the pressure in the latter.

9. A snap-acting valve for opening and closing a first conduit in response to changes in fluid pressure in a second conduit, comprising a housing defining a chamber closed at one end by a first flexible diaphragm and divided into first and second compartments by a second flexible diaphragm, a port communicating with the first compartment of said chamber and adapted to be connected to said second conduit for subjecting said diaphragms to a variable pressure within said first compartment, mechanism mounted on said housing for adjusting the resistance of said first diaphragm to said variable pressure, said housing also defining a valve chamber adapted to be interposed in said first conduit and including an inlet and an outlet port permitting fluid flow therethrough, a movable valve element disposed in said valve chamber for opening and closing the valve chamber to fluid flow therethrough, said movable valve element having a valve stem projecting into said first compartment, first means movable between operative and inoperative positions in response to movement of said first diaphragm and being adapted in its operative position to apply a valve-closing force to said valve stem, a first spring associated with said first means for urging it toward its operative position, a second spring associated with said first means for urging it toward its inoperative position, second means acting between said second diaphragm and said second spring for rendering said second spring inoperative in response to a pressure increase in said second compartment, and a conduit connecting said outlet port with said second compartment for controlling the pressure in the latter.

10. A snap-acting valve for opening and closing a first conduit in response to changes in fluid pressure in a second conduit, comprising a housing defining a chamber closed at one end by a first flexible diaphragm and divided into first and second compartments by a second flexible diaphragm, a port communicating with said first compartment and adapted to be connected to said second conduit for subjecting said diaphragms to a variable pressure within said first compartment, said housing also defining a valve chamber adapted to be interposed in said first conduit and including an inlet and an outlet port permitting fluid flow therethrough, a movable valve element disposed in said valve chamber for opening and closing the valve chamber to fluid flow therethrough, said movable valve element having a valve stem projecting into said first compartment, first means movable between operative and inoperative positions in response to movement of said first diaphragm and being adapted in its operative position to apply a valve-closing force to said valve stem, a first spring associated with said first means for urging it toward its operative position, a second spring associated with said first means for urging it toward its inoperative position, mechanism mounted on said housing for adjusting the force exerted by said second spring on said first means, second means acting between said second diaphragm and said second spring for rendering said second spring inoperative in response to a pressure increase in said second compartment, and a conduit connecting said outlet port with said second compartment for controlling the pressure in the latter.

11. A snap-acting valve for opening and closing a first conduit in response to changes in fluid pressure in a second conduit, comprising a housing defining a chamber closed at one end by a first flexible diaphragm and divided into first and second compartments by a second flexible diaphragm, a port communicating with said first compartment and adapted to be connected to said second conduit for subjecting said diaphragms to a variable pressure within said first compartment, mechanism mounted on said housing for adjusting the resistance of said first diaphragm to said variable pressure, said housing also defining a valve chamber adapted to be interposed in said first conduit and including an inlet and an outlet port permitting fluid flow therethrough, a movable valve element disposed in said valve chamber for opening and closing the valve chamber to fluid flow therethrough, said movable valve element having a valve stem projecting into said first compartment, first means movable between operative and inoperative positions in response to movement of said first diaphragm and being adapted in its operative position to apply a valve closing pressure to said valve stem, a first spring associated with said first means for urging it toward its operative position, a second spring associated with said first means for urging it toward its inoperative position, mechanism mounted on said housing for adjusting the force exerted by said second spring on said first means, second means acting between said second diaphragm and said second spring for rendering said second spring inoperative in response to a pressure increase in said second compartment, and a conduit connecting said outlet port with said second compartment for controlling the pressure in the latter.

12. Valve-actuating mechanism comprising a frame, a lever pivotally mounted on said frame and having a cam surface thereon, cam-actuating means mounted on said frame and including a roller mounted for movement along said cam surface between operative and inoperative positions with respect thereto and pressure-responsive means for controlling the position of said roller along said cam surface and yieldable means urging said roller toward said cam surface and toward an operative position with respect thereto, means for adjusting said pressure-responsive means for varying the pressures to which it is responsive, and additional yieldable means for urging said roller along said cam surface toward an inoperative position against the action of said first-named yieldable means.

13. Valve-actuating mechanism comprising a frame, a lever pivotally mounted on said frame and having a cam surface thereon, cam-actuating means mounted on said frame and including a roller mounted for movement along said cam surface between operative and inoperative positions with respect thereto and pressure-responsive means for controlling the position of said roller along said cam surface and yieldable means for urging said roller toward said cam surface and toward an operative position with respect thereto, means for adjusting said pressure-responsive means for varying the pressures to which it is responsive, additional yieldable means for urging said roller along said cam surface toward an inoperative position against the action of said first-named yieldable means, means for adjusting said additional yieldable means for varying the force applied thereby to said roller, and additional pressure-responsive means for rendering said additional yieldable means inoperative.

14. Valve-actuating mechanism comprising a frame, a lever pivotally mounted on said frame and having a cam surface thereon, cam-actuating means mounted on said frame and including a roller mounted for movement along said cam surface between operative and inoperative positions with respect thereto and pressure-responsive means for controlling the position of said roller along said cam surface and a first spring for urging said roller toward said cam surface and toward an operative position with respect thereto, means for adjusting said pressure-responsive means for varying the range of pressures to which it is responsive, a second spring for urging said roller along said cam surface toward an inoperative position against the action of said first spring, and additional pressure-responsive means for rendering said second spring inoperative.

15. Valve-actuating mechanism comprising a frame, a lever pivotally mounted on said frame and having a cam surface thereon, cam-actuating means mounted on said frame and including a roller mounted for movement along said cam surface between operative and inoperative positions with respect thereto and pressure-responsive means for controlling the position of said roller along said cam surface and a first spring for urging said roller toward said cam surface and toward an operative position with respect thereto, means for adjusting said pressure-responsive means for varying the range of pressures to which it is responsive, a second spring for urging said roller along said cam surface toward an inoperative position against the action of said first spring, and additional pressure-responsive means for rendering said second spring inoperative, said second spring being adjustable to vary the force applied thereby to said roller.

16. Valve-actuating mechanism comprising a housing defining a chamber closed at one end by a first flexible diaphragm and divided into first and second compartments by a second flexible diaphragm, a valve-actuating cam, cam-operating means movable between operative and inoperative positions in response to movement of said first diaphragm, first yieldable means urging said cam-operating means toward said cam and toward an operative position with respect thereto, and second yieldable means operative in response to movement of said second diaphragm for opposing the action of said first yieldable means.

17. Valve-actuating mechanism comprising a housing defining a chamber closed at one end by a first flexible diaphragm and divided into first and second compartments by a second flexible diaphragm, a lever pivotally mounted on said housing and having a cam surface thereon, lever-actuating means mounted on said housing and including a roller mounted for movement along said cam surface between operative and inoperative positions with respect thereto and a first spring for urging said roller toward said cam surface and toward an operative position with respect thereto, said lever-actuating means being associated with said first diaphragm for controlling the position of said roller with respect to said cam surface in response to variations in pressure within said first compartment, and a second spring associated with said second diaphragm for urging said roller toward an inoperative position with respect to said cam surface in response to a drop in pressure within said second compartment.

18. Valve-actuating mechanism comprising a housing defining a chamber closed at one end by a first flexible diaphragm and divided into first and second compartments by a second flexible diaphragm, a lever pivotally mounted on said housing and having a cam surface thereon, lever-actuating means mounted on said housing and including a roller mounted for movement along said cam surface between operative and inoperative positions with respect thereto and a first spring for urging said roller toward said cam surface and toward an operative position with respect thereto, said lever-actuating means being associated with said first diaphragm for controlling the position of said roller with respect to said cam surface in response to variations in pressure within said first compartment, means for varying the resistance of said first diaphragm to pressure within said first compartment, and a second spring associated with said second diaphragm for urging said roller toward an inoperative position with respect to said cam surface in response to a drop in pressure within said second compartment.

19. Valve-actuating mechanism comprising a housing defining a chamber closed at one end by a first flexible diaphragm and divided into first and second compartments by a second flexible diaphragm; a lever pivotally mounted on said housing and having a cam surface thereon, lever-actuating means mounted on said housing and including a roller mounted for movement along said cam surface between operative and inoperative positions with respect thereto and a first spring for urging said roller toward said cam surface and toward an operative position with respect thereto, said lever-actuating means being associated with said first diaphragm for controlling the position of said roller with respect to said cam surface in response to variations in pressure within said first compartment, means for varying the resistance of said first diaphragm to pressure within said first compartment, a second spring associated with said second diaphragm for urging said roller toward an inoperative position with respect to said cam surface in response to a drop in pressure within said second compartment, and means for varying the force applied by said second spring to said roller.

20. The valve claimed in claim 5, in which the mechanism mounted on said housing for adjusting the resistance of said first diaphragm to said variable pressure comprises adjustable spring means exerting tension on said first diaphragm.

21. The valve claimed in claim 5, in which the mechanism mounted on said housing for adjusting the resistance of said first diaphragm to said variable pressure comprises a second pressure chamber on the opposite side of said first diaphragm from said first-mentioned closed chamber and means to vary the pressure within said second pressure chamber.

22. The mechanism claimed in claim 12 in which the means for adjusting said pressure-responsive means for varying the pressure to which it is responsive comprises adjustable spring means exerting tension on said pressure-responsive means.

23. The mechanism claimed in claim 12 in which the means for adjusting said pressure-responsive means for varying the pressure to which it is responsive comprises a pressure chamber on the opposite side of said pressure-responsive means from said roller and means to regulate the pressure in said chamber.

24. The mechanism claimed in claim 18 in which the means for varying the resistance of said first diaphragm to pressure within said first compartment comprises adjustable spring means exerting tension against said first diaphragm.

25. The mechanism claimed in claim 18 in which the means for varying the resistance of said first diaphragm to pressure within said first compartment comprises a third compartment closed on one end by said housing and on the other end by said first diaphragm, and means for regulating the pressure within said compartment.

JOHN K. HELLER.

REFERENCES CITED

The following references are of record in the file of this patent:

UNITED STATES PATENTS

| Number | Name | Date |
|---|---|---|
| 468,440 | Fortier | Feb. 9, 1892 |
| 1,986,511 | Mayer | Jan. 1, 1935 |
| 2,142,903 | King | Jan. 3, 1939 |
| 2,267,688 | Landon | Dec. 23, 1941 |